Sept. 3, 1935.  W. D. HAMERSTADT  2,013,561
TRUCK STRUCTURE
Filed Nov. 30, 1931
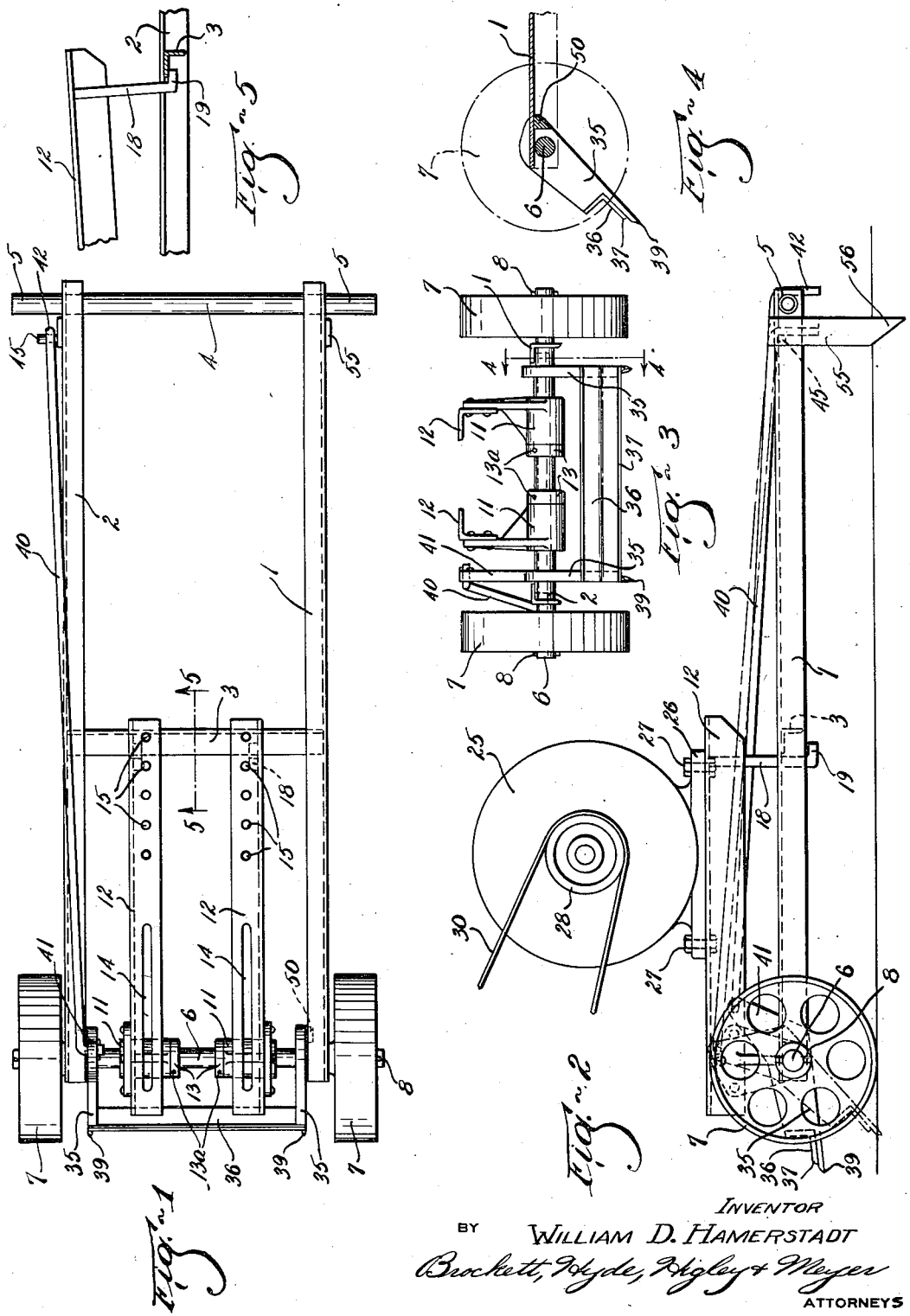
INVENTOR
BY  WILLIAM D. HAMERSTADT
Brockett, Hyde, Higley & Meyer
ATTORNEYS Patented Sept. 3, 1935

2,013,561

UNITED STATES PATENT OFFICE 2,013,561

TRUCK STRUCTURE

William D. Hamerstadt, Indianapolis, Ind., assignor, by mesne assignments, to General Fibre Products, Incorporated, Indianapolis, Ind., a corporation of Indiana Application November 30, 1931, Serial No. 578,007

6 Claims. (Cl. 280—53)

This invention relates to an improved hand truck adapted to have mounted thereon a suitable pulley-carrying driving power unit, such as an electric motor or a gasoline engine, whereby said driving power unit, on said truck, may be readily moved about and used to selectively drive a plurality of machines or devices. The present truck is particularly useful on farms, for example, where many power driven machines and devices are used, such as air compressors, milking machines, corn shellers, ensilage cutters, etc. Since said machines are usually not used at the same time, a single power unit, mounted on one of the present trucks, may be used to drive all of said machines, with obvious economy and with ease and convenience, as will later appear.

The general object of the present invention is the provision of an improved truck of the character described which is of quite simple and inexpensive construction, easy to handle and move about, even with a driving power unit thereon, and which is of exceptionally strong and sturdy character.

A more detailed object of the present invention is the provision of an improved truck of the character described which is adapted to have the driving power unit pivotally mounted thereon, so that the weight of said unit can be utilized to provide the necessary tension on the driving belt which connects the pulley of the power unit with the pulley of the machine or device to be driven.

Another more detailed object of the present invention is the provision of an improved truck of the character described which has simple but highly effective means for preventing movement of said truck when it has been brought into proper position relative to the machine or device to be driven, said means being located at the front end of the truck but being controllable by the truck operator at the rear end of the truck, where is located the truck handle.

Further objects of the invention will be obvious and others thereof will be pointed out as the description of the invention proceeds.

The invention will be readily understood from the following description of one embodiment thereof, reference being had to the accompanying drawing in which Fig. 1 is a top plan view of the present improved truck; Fig. 2 is a side elevation thereof with an electric motor shown mounted thereon, said truck and said motor being in driving position; Fig. 3 is a front elevation of the truck; Fig. 4 is a detail view of the means at the front of the truck for preventing movement of said truck, said view being on the line 4—4, Fig. 3; and Fig. 5 is a detail view of the means for limiting upward movement of the pivoted truck arms upon which the driving power unit is mounted, said view being on the line 5—5, Fig. 1, but showing the parts in a slightly different position.

As shown in the accompanying drawing, the present improved truck includes a suitable frame comprising a pair of longitudinally disposed, generally parallel side members 1 and 2, arranged in spaced relation and connected or joined substantially midway their ends by a cross member 3 having its ends riveted, spot-welded or otherwise suitably secured to the frame side members. In the present embodiment of the invention, the frame side members 1 and 2 and the frame cross member 3 are in the form of angle irons, so that they are strong and rigid, yet of inexpensive character.

The frame side members 1 and 2 extend substantially the full length of the truck and the rear end portions thereof are connected or joined by a transversely disposed handle member 4 preferably having its end portions 5 projecting outwardly beyond the frame side members a sufficient distance to enable said portions to be grasped by the truck operator, if desired, when moving the truck about. Said handle member may be, if desired, a simple metal tube, it being so shown in the present embodiment of the invention.

At their front ends, the frame side members 1 and 2 carry a transversely disposed axle member 6 on the end portions of which are journalled relatively wide, ground-engaging wheels 7, said wheels being prevented from escaping from said axle member by cotter pins 8 or the like carried thereby.

Pivotally and slidably mounted on the axle member 6, between the frame side members 1 and 2, are the front end portions of a pair of supporting arms adapted to have mounted thereon a pulley-carrying driving power unit, such as an electric motor or a gasoline engine. In the present embodiment of the invention, each of said supporting arms comprises a member 11 pivotally and slidably mounted on the axle member 6 and having riveted, spot-welded or otherwise suitably secured to its upper end the front end portion of a rearwardly extending, longitudinally disposed bar 12. These arm bars, which are here shown as in the form of angle irons, have a length substantially half that of the frame side members 1 and 2, so that the rear end portions of said bars overlie and normally rest upon the frame cross member 3. To prevent these two supporting arms from sliding along the axle member 6 when a motor or other suitable driving power unit is mounted upon said arms, a pair of collars 13 are provided on said axle member, said collars lying between the members 11 of said arms and being held in proper adjusted position on said axle member by set screws 13a extending through said collars and engaging said axle member, all as best shown in Fig. 3.

In order to enable a driving power unit to be easily and properly mounted on said supporting arms, the front end portions of the arm bars 12 are each provided with a longitudinally disposed, bolt-receiving slot 14 and the rear end portions of said bars are each provided with a plurality, say five, of bolt-receiving apertures 15 longitudinally disposed therealong, whereby driving units having bases of varying lengths may be mounted on said arms, as will be readily understood. Due to the fact that the members 11 of said arms are slidably, as well as pivotally, mounted on the axle member 6, said arms may be moved toward and from each other, by simply adjusting one or both of the collars 13, to thereby accommodate driving units having bases of varying widths, as also will be readily understood.

Since the rear end portions of the arm bars 12 overlie the frame cross member 3, downward swinging movement of the rear end portions of said arm bars is limited by said frame cross member and in order to limit upward swinging movement of said arm bar rear end portions, each of said end portions rigidly carries a depending hook member 18, the rearwardly extending hook portion 19 of which underlies the frame cross member 3 and, as shown in Fig. 5, by engagement therewith, effectively limits upward swinging movement of said arm bar rear end portions, as will be readily understood.

Fig. 2 illustrates more or less conventionally a suitable electric motor 25 mounted on the pivoted truck supporting arms, the base 26 of said motor being secured to the bars 12 of said arms by suitable bolts 27. Said motor carries a driving pulley 28 over which travels a suitable driving belt 30.

Due to its light weight and its wide ground-engaging wheels 7, the present truck is easily and conveniently moved about, even with a driving power unit, such as the electric motor 25, mounted thereon, inasmuch as the weight of said motor or other power unit is distributed over the front end of the truck, where are located the truck wheels.

To drive a machine or device by means of the electric motor 25 mounted on the present truck, said truck is moved by the truck operator up to said machine or device, close enough thereto to enable the driving belt 30 to connect the pulley 28 of said motor with the pulley of the machine or device to be driven. The connection by belt 30 of the motor pulley 28 and the pulley of the machine or device to be driven is effected when the driving motor 25 is in raised position, substantially the raised position it occupies when the truck is being moved about. Then, when the rear or handle end of the truck is lowered, as in Fig. 2, said motor will remain in an elevated position, due to the connection, by belt 30, of its pulley 28 with the pulley of the machine or device to be driven. The weight of said motor, being therefore directly effective upon the belt 30, serves to maintain a proper driving tension on said belt, as will be readily understood.

When the rear end of the truck is being lowered, after connection by belt 30 of the motor pulley 28 and the pulley of the machine or the device to be driven, there is a considerable tendency for the truck to move forwardly or sideways, or both ways, and in order to prevent such movement and to thereafter maintain the truck in proper position with respect to the machine or device being driven, suitable holding or locking means for the truck is employed. While said means is located at the front end of the truck, it is controllable by the truck operator at the rear or handle end of the truck.

The particular holding or locking means here shown comprises a pair of spaced brackets 35 pivoted at their rear ends on the axle member 6 just within the frame side members 1 and 2. Rigidly secured on the front end of said brackets it a transversely disposed holding or locking member 36, the front end portion 37 of which is adapted to engage and more or less dig into the ground or floor upon which the truck rests and by such engagement, hold or lock the truck against movement. If desired, the ground-engaging front portion 37 of the holding or locking member 36, which member is here shown as of angle shape, may be assisted, in its truck holding or locking function, by one or more prongs 39 which more easily dig into the ground or floor upon which the truck rests. In the present embodiment of the invention, two such prongs are here shown, said prongs lying beneath the holding or locking member 36 and projecting forwardly a slight distance beyond the front edge of its front ground-engaging portion 37. As here shown, said prongs are integral parts of the end brackets 35.

Due to its pivotal mounting, the holding or locking member 36 normally tends to fall by gravity down into holding or locking position, as shown in Figs. 1, 3, and 4 and also in dotted lines, Fig. 2. For maintaining said holding or locking member in inoperative position, when moving the truck about, etc., a suitable control rod 40 is provided therefor, said rod having its front end suitably connected to an extension 41 of one of the brackets 35 which carry the holding or locking member 36. The left hand bracket, Fig. 3, is the one which is here provided with the extension 41, said extension being an integral part of said bracket, as shown. The control rod 40 extends to the rear end of the truck and the rear end of said rod carries a depending hook portion 42 adapted to engage back of the truck handle member 4 when it is desired to hold the holding or locking member 36 in inoperative position. Therefore, to hold or lock the truck in a certain position or location, the truck operator, at the rear end of the truck, simply lifts the hook portion 42 from its position behind the truck handle 4 and permits the holding or locking member 36 to fall by gravity into truck holding or locking position. To keep the rear end portion of control rod 40 off of the ground when the holding or locking member 36 is in operative position, a suitable pin 45, Fig. 1, may be provided at the rear end of the truck for receiving the rod hook portion 42, and on said pin, it will be quite conveniently positioned for future manipulation of the control rod.

In order to limit downward swinging movement of the holding or locking member 36, or in other words, counter-clockwise movement, as viewed in Fig. 4, at least one of the brackets 35 which carry the holding or locking member 36 is provided with a suitable stop abutment 50, located on the outer surface of said bracket and adapted for engagement with the under surface of the top portion of the adjacent frame side member. In Fig. 4, the stop abutment of the right hand bracket, Fig. 3, is clearly shown, said abutment being in engagement with the frame side member 1.

In order to support the rear end of the truck when said truck is not in use, and also during a driving operation by the power unit mounted on said truck, the rear end portions of the frame side members 1 and 2 are each provided with a depending leg 55, the upper ends of said legs being riveted, spot-welded or otherwise rigidly secured to said frame member end portions just in front of the handle member 4. If desired, and as shown, the lower ends 56 of said legs may be pointed so that they will more or less dig into the ground or floor upon which the truck rests and thus aid in maintaining the truck against undesired movement. As here shown, the legs 55 are simple flat metal bars and the upper leg, as viewed in Fig. 1, may be the part which carries the pin 45 over which hangs the hooked rear end 42 of the control rod 40 when the truck holding and locking means at the front of the truck is in operative position.

While I have here shown and described a preferred embodiment of my invention, it is to be understood that many changes can be made therein without departing from either the scope or the spirit of my invention.

What I claim is:

1. A truck of the character described, comprising a frame, axle means carried thereby, a pair of ground-engaging, frame-supporting wheels journalled on said axle means, and supporting means adapted to receive and support a driving power unit having a driving pulley, said supporting means being pivotally mounted on and being adjustable along said axle means between said wheels and terminating short of the rear end of said frame.

2. A truck of the character described, comprising a frame, axle means carried thereby, a pair of ground-engaging frame-supporting wheels journalled on said axle means, and a pair of supporting arms independently mounted on said axle means for pivotal movement thereabout and sliding adjustment therealong, said supporting means terminating short of the rear end of said frame and being adapted to receive and support a driving power unit having a driving pulley.

3. A truck of the character described, comprising a frame having a pair of longitudinally disposed, generally parallel side members arranged in spaced relation and a cross member connecting said side members intermediate the ends thereof, transversely disposed handle means connecting the rear end portions of said frame side members, transversely disposed axle means connecting the front end portions of said frame side members, a pair of ground-engaging frame-supporting wheels journalled on said axle means, and supporting means adapted to receive and support a driving power unit having a driving pulley, said supporting means having its front end portion pivotally mounted on said axle means between said frame side members and having its rear end portion overlying said frame cross member.

4. A truck of the character described, comprising a frame having a pair of longitudinally disposed, generally parallel side members arranged in spaced relation and a cross member connecting said side members intermediate the ends thereof, transversely disposed handle means connecting the rear end portions of said frame side members, transversely disposed axle means connecting the front end portions of said frame side members, a pair of ground-engaging frame-supporting wheels journalled on said axle means on the outer sides of said frame side members, and supporting means adapted to receive and support a driving power unit having a driving pulley, said supporting means having its front end portion pivotally mounted on said axle means between said frame side members and having its rear end portion overlying said frame cross member.

5. A truck of the character described, comprising a frame having a pair of longitudinally disposed, generally parallel side members arranged in spaced relation and a cross member connecting said side members intermediate the ends thereof, transversely disposed handle means connecting the rear end portions of said frame side members, transversely disposed axle means connecting the front end portions of said frame side members, a pair of ground-engaging frame-supporting wheels journalled on said axle means on the outer sides of said frame side members, and supporting means adapted to receive and support a driving power unit having a driving pulley, said supporting means having its front end portion pivotally mounted on said axle means between said frame side members and having its rear end portion overlying said frame cross member, the rear end portion of said supporting means being provided with a hook member for engaging from below said frame cross member, whereby upward swinging movement of the rear end portion of said supporting means relative to said frame cross member is limited.

6. A truck of the character described, comprising a frame having a pair of longitudinally disposed, generally parallel side members arranged in spaced relation and a cross member connecting said side members intermediate the ends thereof, transversely disposed handle means connecting the rear end portions of said frame side members, transversely disposed axle means connecting the front end portions of said frame side members, a pair of ground-engaging, frame-supporting wheels journalled on said axle means, and a pair of supporting arms independently mounted on said axle means between said frame side members for pivotal movement about said axle means and for slidable movement therealong, said supporting arms being adapted to receive and support a driving power unit having a driving pulley.

WILLIAM D. HAMERSTADT.